Jan. 2, 1962 J. H. MacMILLAN, JR., ET AL 3,015,373
METHOD AND STRUCTURE FOR STORING SEMI-FLUID MATERIAL
Filed Aug. 8, 1956 5 Sheets-Sheet 1
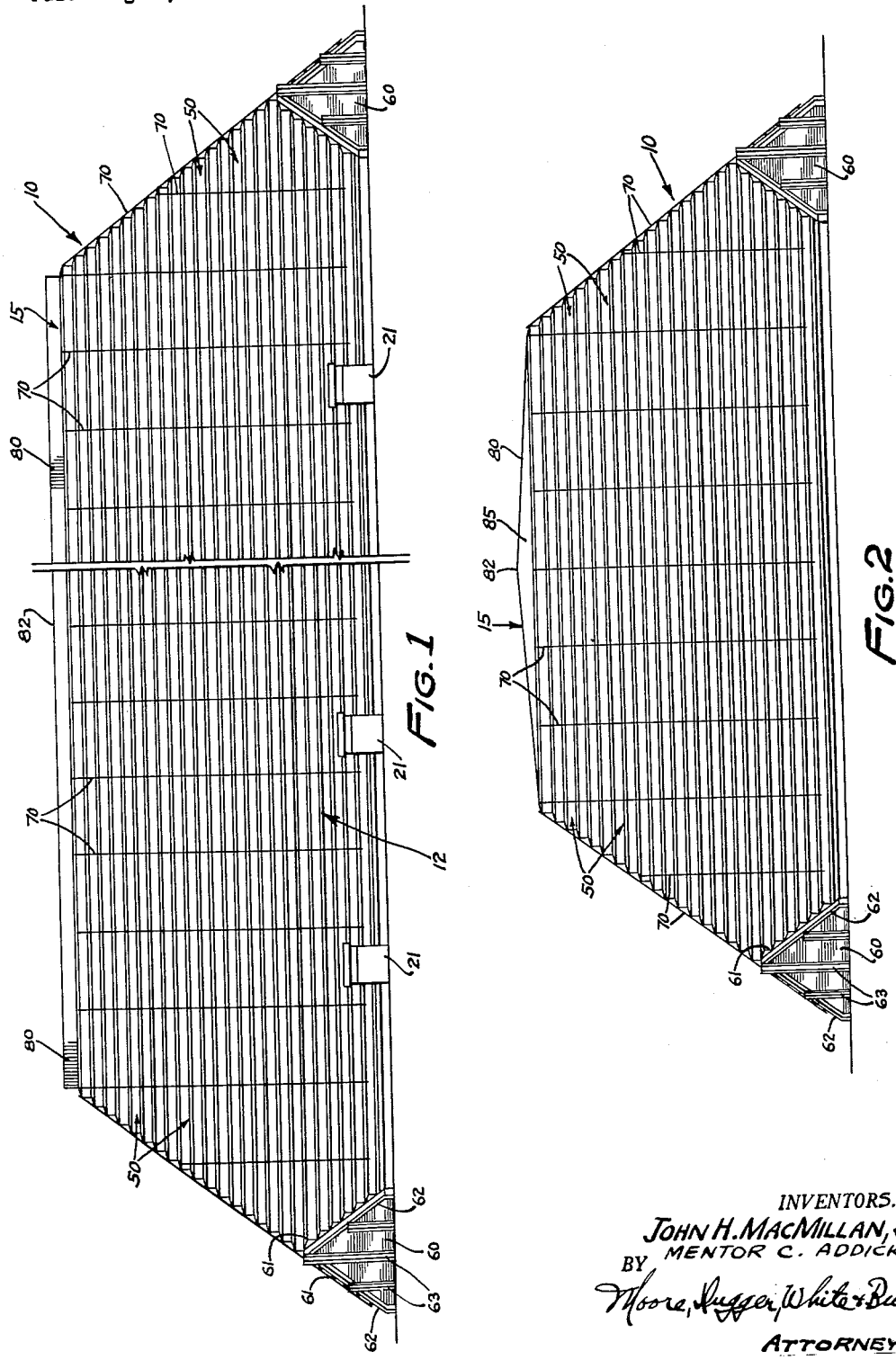
INVENTORS.
JOHN H. MACMILLAN, JR.
MENTOR C. ADDICKS
BY
ATTORNEYS Jan. 2, 1962   J. H. MacMILLAN, JR., ET AL   3,015,373
METHOD AND STRUCTURE FOR STORING SEMI-FLUID MATERIAL
Filed Aug. 8, 1956   5 Sheets-Sheet 2
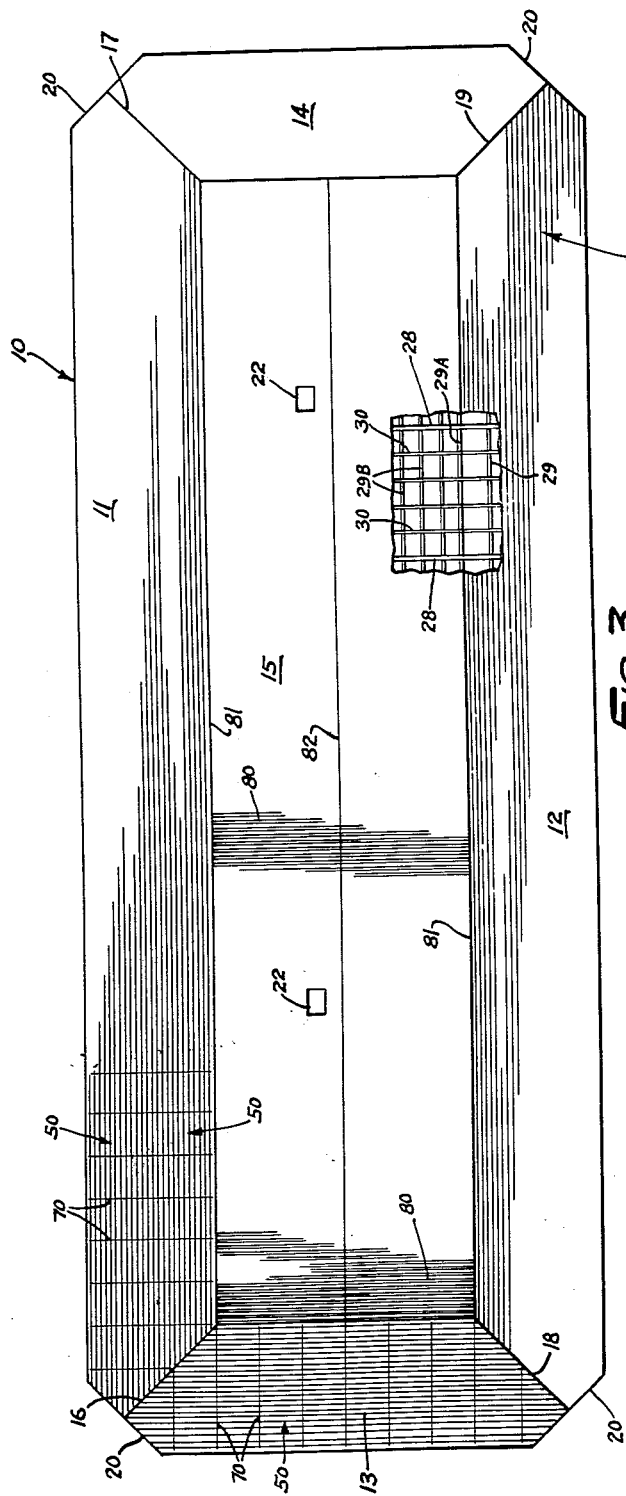
INVENTORS.
JOHN H. MacMILLAN, JR.
MENTOR C. ADDICKS
BY
ATTORNEYS Jan. 2, 1962  J. H. MacMILLAN, JR., ET AL  3,015,373
METHOD AND STRUCTURE FOR STORING SEMI-FLUID MATERIAL
Filed Aug. 8, 1956  5 Sheets-Sheet 3
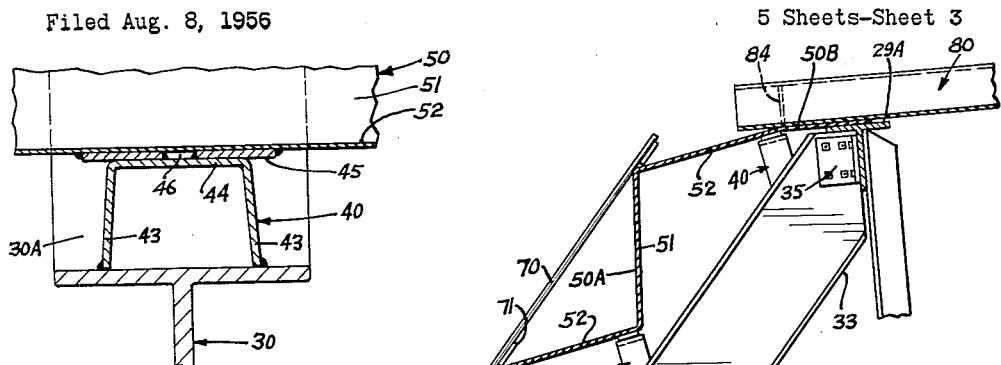
FIG. 6
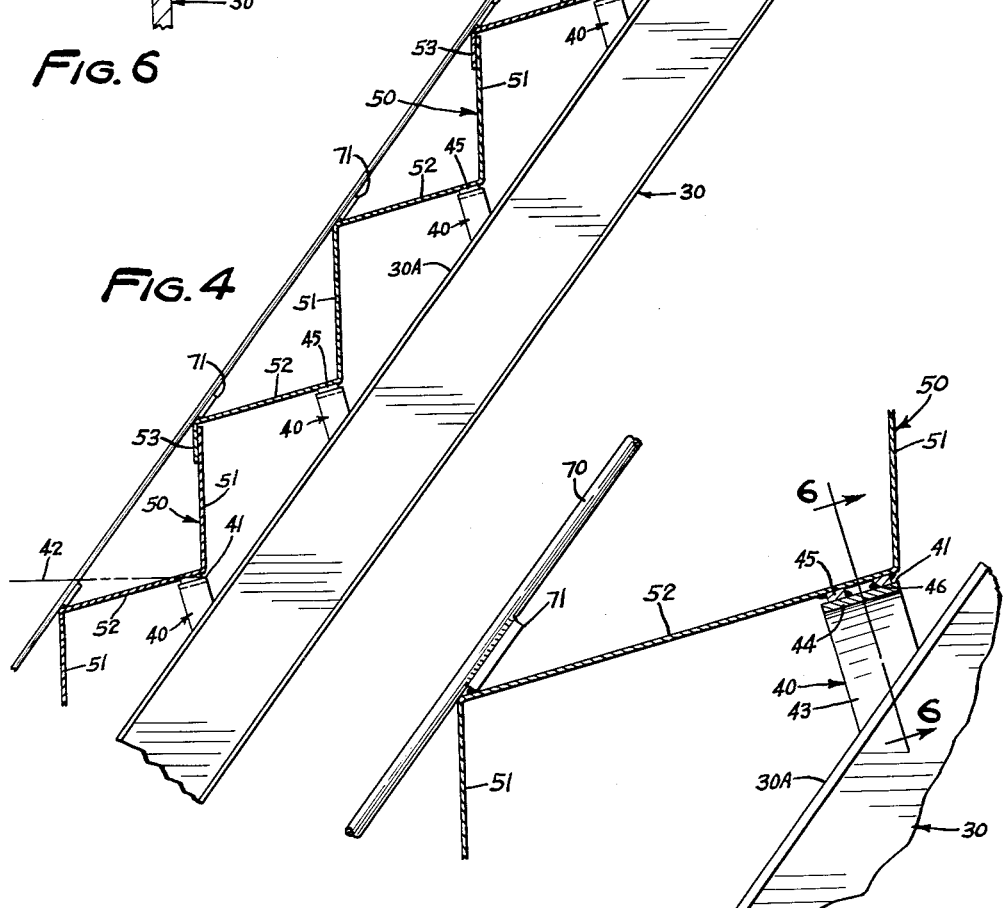
FIG. 4
FIG. 5
INVENTORS
JOHN H. MacMILLAN, JR.
MENTOR C. ADDICKS
BY
Moore, Sugar, White & Burd
ATTORNEYS

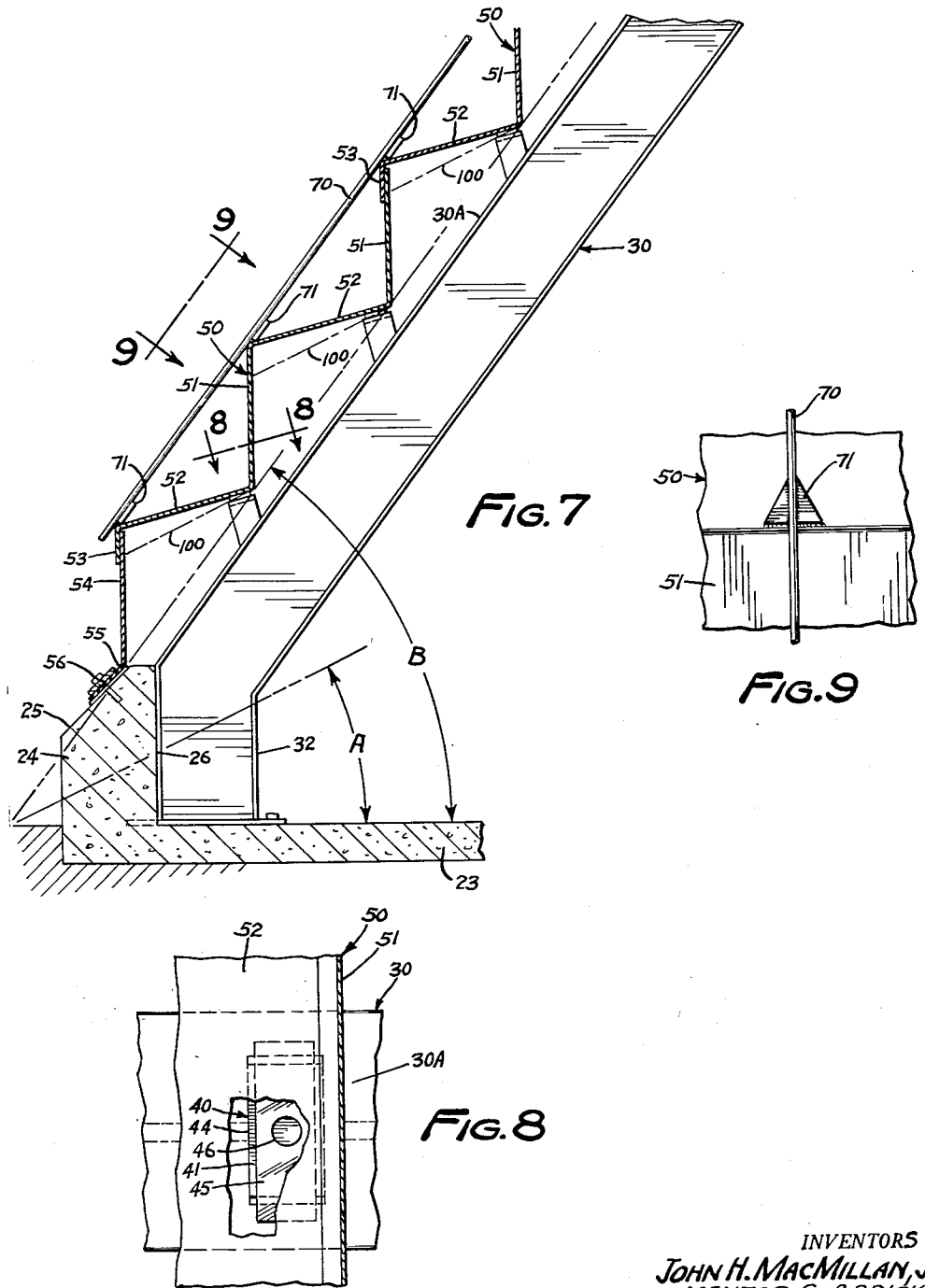

United States Patent Office 3,015,373
Patented Jan. 2, 1962

3,015,373
METHOD AND STRUCTURE FOR STORING SEMI-FLUID MATERIAL
John H. MacMillan, Jr., Wayzata, and Mentor C. Addicks, Minneapolis, Minn.; John Hugh MacMillan III, Cargill MacMillan, Jr., and A. J. James, executors of said John H. MacMillan, Jr., deceased, assignors to Cargill, Incorporated, Minneapolis, Minn., a corporation of Delaware
Filed Aug. 8, 1956, Ser. No. 602,772
11 Claims. (Cl. 189—3)

The present invention relates to new and useful improvements in method and structure adapted for efficient storage of semi-fluid, comminuted or bulk aggregate material such as grain, fertilizer, feed, seeds, chemicals, etc. While this invention is adapted for and directed principally to method and structure for storing farm grains, such as wheat, corn, oats, barley, flax, rye, soybeans, etc., there are many other semi-fluids or bulk aggregates and this method and structure is adapted readily and efficiently to store a wide variety of them.

Grain and other comminuted materials which, when under storage confine, obey the laws of semi-fluids have heretofore in the main been stored in upright containers or bins usually in the form of square or cylindrical silos and having substantially vertical walls. In any of such storage containers of substantial diameter and height, extreme lateral pressures are encountered, becoming greater as the height of the pile within the container increases, and the walls of such containers, bins or buildings must be considerably reinforced, particularly at lower portions to withstand the severe lateral pressures imposed. In many instances, where the walls have not been so reinforced or inadequately reinforced, failure or buckling of walls has occurred. It has therefore been heretofore impossible to store piles of grain of any magnitude in structures having walls of relatively thin sheet material such as sheet steel, etc. Various attempts have been made to provide storage structures which will contain efficiently a substantial amount of grain and in which the walls are relatively thin and unreinforced and in which the lateral pressures against the wall are reduced to minimize wall failure. In the main, these have been unsuccessful because of the extremely limited storage capacity.

It is therefore an object of this invention to provide new and useful method and structure for the storage of semi-fluid materials which allow great capacity and minimal wall reinforcement.

A further object of this invention is to provide new and useful method and structure for the storage of semi-fluid materials in which the lateral pressure on the structure walls is minimized by the construction of the walls.

A further object of this invention resides in the provision of a method and structure for the storage of semi-fluid materials in which a pile is confined by walls of sheet material and has an inclined slope of stepped construction.

A further object of this invention is to provide a grain storage building having a stepped wall structure.

Still further objects of this invention reside in the specific steps of the method of confining semi-fluids and particularly grain.

Still further objects of the invention reside in the specific constructional details of the storage structure and the critical limitations thereof.

Other and further objects are those inherent and apparent in the method and structure as described, pictured and claimed and will become further evident as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

According to the method of this invention, grain is piled, usually by being permitted to flow from an orifice or orifices on a substantially planar supporting surface such as a concrete slab and is confined to a pile. The pile may be of conical, frusto-conical, prismatic or other shape but usually is either frusto-conical or frusto-prismatic. In the preferred embodiment, the pile comprises a prism having a pair of major walls and a pair of minor walls to form a horizontal cross-section, the major walls generally sloping upwardly and converging, and the minor walls likewise generally sloping upwardly and converging to form opposed and upwardly and inwardly directed major walls and similar minor walls. The grain is thus confined between opposing peripheral surfaces having an extension therebetween, the extension gradually decreasing from bottom to top of the pile. The grain is so confined at each of the major and minor walls to form a series of steps having "tread" portions and "riser" portions in the manner of ordinary building stairs or steps. These steps are provided in the pile by a plurality of horizontally extending coextensive but vertically spaced riser portions, each succeeding portion being upwardly and inwardly spaced from its preceding portion, as preferred by a substantially equivalent amount. The top edges of adjacent risers or the bottom edges of adjacent risers will lie in a plane inclined with reference to the horizontal supporting surface at an angle above the angle of repose of the semi-fluid being stored, and not substantially greater than the angle of rupture thereof (twice the angle of repose). Preferably, it is at the angle of rupture of the semi-fluid being stored. In the instance of farm grains, such as wheat, corn, soybeans, etc., the angle of repose has been found to be from 23 to 28 degrees and the angle of rupture has been correspondingly found to be at 46–56 degrees. Preferred dimensions of these angles are 26 and 53 degrees respectively.

While considerable work and research has been undertaken to determine the scientific principles and calculations involved in the storage of grain and other semi-fluids, and theories relating to the calculation of lateral stress have been propounded of varying merit; much is left unknown. It has commonly been accepted that the angle of repose A of a material is the angle with the supporting base which the inclined side of a pile of grain will naturally assume when permitted to flow from a point into a pile. The tangent of this angle is recognized as the coefficient of internal friction of the material itself. This has been recognized in Patent No. 2,724,151.

At least one theory of lateral pressures in bins having vertical walls attributes the pressure on the wall to be due to a wedge of grain which lies between the vertical wall and a plane passed through the grain from the base of the wall, called the plane of rupture. This plane is stated to be the plane at which the grain will fracture and is at an angle B approximately twice the angle of repose A.

It was therefore conceived that if the pressure on a vertical bin wall were due to the wedge of grain between the plane of rupture and wall, and the wall were inclined inwardly at the plane of rupture there might be no lateral pressure. This is not true in actual practice. However, it was further conceived that if the wall could be sloped inwardly at an angle not substantially greater than the angle of rupture and provided with a series of steps affording structural forms, the lateral pressures would be so materially reduced as to change any increase in the lateral pressure due to depth of pile from a geometric progression to an arithmetic progression and allow confinement of tremendous volumes of grain or the like with exceedingly thin sheet material.

Regardless of the theory, however, it has been found possible to confine huge volumes of grain according to the method and by the structure of this invention with sheet materials, i.e. steel of minimum strength and thickness not heretofore possible before this invention.

The structure of this invention will now be described with reference to the drawings in which corresponding numerals refer to the same parts and in which:

FIGURE 1 is a side elevational view of the structure of the instant invention;

FIGURE 2 is an end elevational view thereof;

FIGURE 3 is a top plan view thereof;

FIGURE 4 is a fragmentary, partly sectional, partly elevational view showing one of the wall supporting members and the stepped wall configuration adjacent the top of the building;

FIGURE 5 is an enlarged fragmentary partly sectional view of one of the steps and supporting structure of FIGURE 4;

FIGURE 6 is a view taken along the line and in the direction of the arrows 6—6 of FIGURE 5;

FIGURE 7 is a fragmentary view similar to FIGURE 4 but showing a portion of frame and wall construction adjacent the bottom of the building;

FIGURE 8 is a partly plan, partly sectional view taken along the line and in the direction of the arrows 8—8 of FIGURE 7;

FIGURE 9 is a fragmentary oblique view taken along the line and in the direction of the arrows 9—9 of FIGure 7;

FIGURE 10 is an isometric view of a section of roof covering;

FIGURE 11 is an isometrtic view of a section of stepped wall covering or skin.

Figure 12:
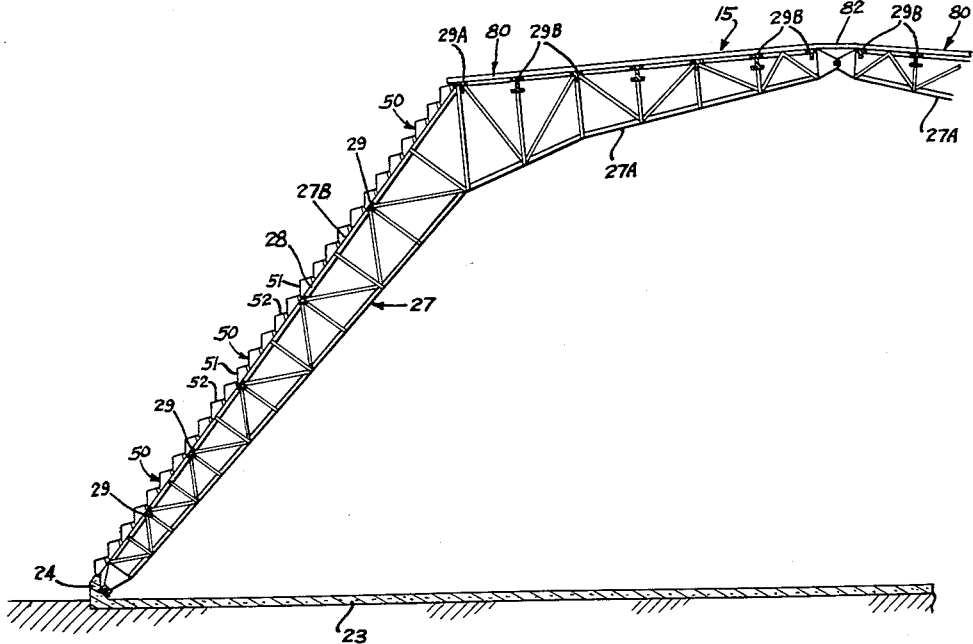
FIGURE 12 is a fragmentary vertical sectional view showing one of the supporting trusses for the instant invention.

As is perhaps shown best in FIGURES 1–3, the building generally designated 10 of this invention, as shown, comprises a frusto-pyramidal prism having truncated corners 20. It provides a pair of opposed upwardly and inwardly inclined side or major faces 11 and 12 joined to a pair of similar end or minor faces 13 and 14 along junctures 16 and 17 for face 11 and 18 and 19 for face 12. Each of the faces 11–14, while providing a generally upwardly and inwardly inclined face is comprised of a plurality of steps, as subsequently explained, and provides a relatively thin sheet paneling or skin for confining the semi-fluid to be confined. The building is provided with access doors 21 and loading doors 22.

The building 10 is positioned upon and supported by a level surface, in this instance the concrete slab supporting surface 23. The slab 23 is provided with a peripheral wall 24 of the configuration best shown in FIGURE 7, which may be integral therewith. It has an exterior surface 25 having an inclined portion and an interior surface.

The building is supported by a framework generally designated 27 supported upon slab 23, cooperating with wall 24 and providing structural support for walls 11–14 and roof 15. The framework comprises a plurality of three-hinged arches 28 formed from cooperating truss members 27A hinged together at the center of the roof and appropriately hinged to the slab 23 at their bottom ends. The arches extend transversely of the building 10 with reference to FIGURE 3 and are spaced as shown in that figure.

Intermediate the spaced three-hinged arches 28 is positioned a plurality of slant structural members, in this instance beams 30, upwardly and inwardly inclined at each wall and positioned so that their top surfaces 30A lie in the same plane at each wall. The top surface 27B for truss members 27A lie in the same plane as the top surface of members 30 for respective walls 11 and 12. There are of course no trusses 27A and hence surfaces 27B for end walls 13 and 14. Hence the plane of the side or major walls is formed by the top surfaces 30A of cooperating members 30 and top surfaces 27B of cooperating trusses 27 and the plane of end walls 13 and 14 is formed by the top surfaces 30A of members 30. A plurality of horizontal beams or other structural members 29 joins these trusses 27A and beams 30 to form a network.

The structural members 30 comprise, as shown, a plurality of inclined structural beams but may be H-beams, truss members, etc. as desired as long as the top surfaces thereof reside substantially in the same inclined plane. In FIGURES 4 and 7 intermediate connecting members 29 have been omitted for the sake of clarity.

Beams 30 are connected at one end 32 to the slab and have a face cooperating with surface 26 as shown and are inclined upwardly and anchored at the other end 33 to connecting member 29A positioned at the juncture of the wall with the roof. The upper end 33 is bolted to an angle clip 35 which is in turn bolted to a flange of connecting member 29A.

Secured to the top surface 30A of each I-beam or structural member 30 and to the top surface 27B of each truss 27A is a plurality of clips 40. Each of the clips 40 has a top surface 41 slightly declined below the horizontal 42 in this instance at an angle of 15 degrees, although this angle may vary between zero and 28 degrees. The clips as shown in FIGURE 6 each comprise a U-member having arms 43 secured to an intermediate web 44. Arms 43 are each correspondingly bevelled from front to rear with reference to FIGURE 6 or from left to right with reference to FIGURE 4, so that intermediate web 44 providing top surface 41 is at the proper angle in this instance 15 degrees below the horizontal to support the stepped covering or skin of the building. The U-clips 40 are welded or otherwise secured to the surface 30A.

An intermediate member or plate 45 having a central aperture 46 and somewhat wider than flange 44 as shown in FIGURE 6 is welded or otherwise secured to surface 41. The central aperture 46 allows welding thereto from the top thereof and the intermediate member provides greater area supporting and joined to the stepped tread as later explained.

It will be noted that the U-clip 40 is positioned so that the arms 43 are parallel and provide an aperture opening in the direction of extension of beam 30 or truss 27A as the case may be so that grain flowing from the top to the bottom of a pile within the building may readily pass between the arms.

A plurality of panels 50 of relatively thin sheet construction, e.g. sheet steel, each providing a plurality of risers 51 and treads 52, forming steps, is supported by the U-clips 40 and forms the skin or covering of the building. The panels are supported from the tread portions 52 on the top surfaces 41 and welded thereto or otherwise joined thereto. The tread portions are formed to provide the same angle of decline as the surface 41. Top riser 51 of panel 50 has positioned in abutment therewith and thereover the stub riser 53 of a succeeding panel which is tack welded thereto at appropriate integrals. Thus, a plurality of panels 50 form a skin for the building as shown in FIGURES 4 and 7. At the bottom of the last panel section forming the wall, an individual riser 54 having a flange 55 has the stub riser 53 positioned thereover and secured thereto and flange 55 is secured to surface 25 by a bolt assembly 56 or otherwise to form a complete wall closure.

The panels 50 as shown in FIGURE 11 are positioned in abutment laterally as well as vertically and overlap laterally as at 57 to provide continuous complete closure. The overlap 57 is tack welded or otherwise secured.

The webs 44 and plates 45 and therefore treads 52 are at a declined angle viz, 15 degrees from the horizontal, which allows rain to drain therefrom, reduces the dust and debris load since it will be washed or blown off, yet provides a not too greatly inclined surface so that it may be walked upon when it is desired to ascend the exterior of the building.

Each top panel 50A is provided with an extension 50B which is substantially a prolongation of the top tread 52, is positioned over the horizontal flange of member 29A and affixed thereto.

The side walls 11 and 12 and the end walls 13 and 14 are thus similarly constructed. It will be apparent by reference to FIGURE 3 that the panels 50 at the ends of any wall where they abut the ends of adjacent walls must be bevelled along a line to provide the respective junctures 16, 17, 18 or 19. The bevelled portions are positioned in abutment and suitably secured together.

Likewise, the panels 50 at the corners 20 of the building are truncated and joined to a corner plate 60 having stepped edges 61 cooperating with the steps formed by panels 50 for adjacent walls and reinforced by frame members 62 and uprights 63, which may be structural beams or other reinforcements. The provision of the truncated corners allows substantially complete evacuation of the structure and precludes small, hard to get at corners, which cannot readily be evacuated.

As shown in FIGURE 1, wall 12 has a plurality of access doors 21 positioned therein at its juncture with slab 23 which are suitably framed so that they may be opened to permit access to the building for inspection or for any other purpose.

A plurality of tie rods 70 is positioned at spaced intervals as shown in FIGURES 1 and 2 on the exterior of each of the walls 11—14. These tie rods are secured to the junctures of respective steps and risers by welding to a triangular gore 71 in turn welded to panels 50 at such junctures. These serve to provide additional added strength to the stepped skin of the building and to provide hand rails for workmen or others ascending any outside face of the building.

The roof of the building comprises a plurality of panels 80 providing alternating ridges and channels which extend laterally of the building as shown in FIGURE 3. The panels extend from juncture 81 to the ridge line 82 of the building and are secured together along ridge line 82. Each of the panels is likewise secured to members 29A and 29B as shown in FIGURE 12 and to portions 50B of top panel 50A as shown in FIGURE 4 to provide a complete closure for the building. Each of the formed ridges 83 is closed at its exterior end by a closure plate 84 joined thereto. Adjoining panels are lapped and joined as at 86 longitudinally of the building to provide a complete roof closure.

Since the trusses 27 form a hip roof for the building having the center ridge 82, the end panels 80 adjacent walls 13 and 14 are joined to the top panels 50 of end walls 13 and 14 by a triangular plate member 85 which may comprise a plurality of sheets forming a triangular gore.

When the building 10 is filled, the grain is delivered through the filling openings 22 and spreads out engaging the wall of the building, trickling down as the pile fills the building through the spaced arms 43 of the U-clips 40. It will thus be confined by the skin of the building into a series of steps providing treads and risers produced by engagement with risers 51 of the building skin. The slope of a plane passed through respective junctures of adjacent treads and risers is not substantially greater than the angle of the rupture of the grain being stored nor less than the angle of repose thereof and as preferred is at an angle of 53 degrees.

As shown the steps of the building comprise riser and tread portions in which the vertical extension of the risers is substantially equal to the declined extension of the treads. It has been found in actual practice, however, that the grain does not fill each of the stepped configurations formed by the treads and risers of the panels 50 completely but leaves a small wedge of unfilled area as shown at lines 100 in FIGURE 7.

The incline of line 100 indicating the surface of the grain is substantially at the angle of repose of the grain or not substantially less than 23 degrees below the horizontal.

In such manner, it will be seen that this invention provides a new and useful storage building having a stepped wall construction providing a skin of sheet material and able to confine a mass of grain not heretofore confineable with the relatively thin unreinforced material herein used.

As many widely differing embodiments of this invention may be made without departing from the spirit and scope thereof, it is to be understood that the specific embodiments described are given by way of example only and the invention is limited only by the terms of the appended claims.

What is claimed:

1. In a building construction the improvement comprising an inclined linear frame member positioned at an acute angle relative to the horizontal, a plurality of wall supporting members positioned in spaced relation therealong, each wall supporting member of sheet material comprising a planar supporting surface joined to supporting legs, said supporting legs being cooperatively inclined for securing to the top of said frame member, and a passageway between said legs in the direction of the extension of said frame member and a step wall skin being secured to said planar supporting surfaces.

2. A storage building for grain or the like having a stepped wall construction, said stepped wall construction providing a plurality of riser portions interspersed with a plurality of tread portions, the depth of said treads and the height of said risers being of substantially uniform dimension, said stepped wall construction being supported by a plurality of inclined linear frame members positioned at an acute angle with the horizontal, a plurality of wall supporting members positioned in vertical spaced relation along each of said frame members, each wall supporting member comprising a planar supporting surface joined to supporting legs, said supporting legs being cooperatively inclined and secured to said frame member, and said planar supporting surface being secured to said tread portions.

3. A grain storage building or the like comprising a horizontal supporting surface, a pair of opposed major walls and a pair of opposed minor walls joined thereto, the major walls generally sloping upwardly and converging, the minor walls likewise generally sloping upwardly and converging, said major and minor walls forming a confine with opposing peripheral surfaces having an extension therebetween gradually decreasing from bottom to top thereof, said major walls and said minor walls comprising a series of steps having opposed tread portions and interposed riser portions, each succeeding riser portion being spaced upwardly and inwardly from its preceding portion by a substantially equivalent amount, the top edges of adjacent risers lying in a plane inclined with reference to the horizontal supporting surface at an angle above that of repose of the material being stored and not substantially greater than twice the angle thereof, each of said major and minor walls comprising a plurality of panels of relatively thin sheet construction, each having its edges tightly secured to and hence in leaktight relationship with adjacent panels, each of said tread portions being declined at an angle of not greater than 15 degrees from the horizontal, said major walls and said minor walls terminating at their top in a common plane to form a frusto-pyramidal prism, said major and said minor walls being truncated at their bottom corners and corner plate means joined thereto, and a plurality of panels forming a roof for said building, said roof comprising joined portions each declined from a central ridge extending between said major walls.

4. A method of storing semi-fluid granular material comprising providing a horizontal support for the bottom of a pile of semi-fluid granular material and confining the sides of said pile of semi-fluid granular material generally at an angle to said horizontal support greater than the angle of repose of said pile of semi-fluid granular material and not in excess of its angle of rupture.

5. The method of claim 4 further characterized by having the sides of the pile of semi-fluid granular material confined at its angle of rupture.

6. The method of claim 4 in which said sides of said pile of semi-fluid granular material are confined in step-like formations having a general inclination as aforesaid.

7. A method of storing grain comprising providing a horizontal support for the bottom of a pile of grain and confining the sides of said pile of grain generally at an angle to said horizontal support greater than the angle of repose of said pile of grain and not in excess of its angle of rupture.

8. In the method of claim 7 in which said sides of said pile of grain are confined at its angle of rupture.

9. The method of claim 7 in which said sides of said pile of grain are confined in step-like formations having a general inclination as aforesaid.

10. The method of claim 7 in which said angle is approximately 53°.

11. The method of claim 7 in which said angle is greater than 23° and not in excess of 56°.

References Cited in the file of this patent

UNITED STATES PATENTS

| | | |
|---|---|---|
| 456,742 | Smidth | July 28, 1891 |
| 799,755 | Powell et al. | Sept. 19, 1905 |
| 1,142,087 | Golding | June 8, 1915 |
| 1,330,709 | Hurt | Feb. 10, 1920 |
| 1,787,149 | Geisler | Dec. 30, 1930 |
| 2,138,037 | Lane | Nov. 29, 1938 |
| 2,178,863 | Pepper | Nov. 7, 1939 |
| 2,231,396 | Smits | Feb. 11, 1941 |
| 2,361,112 | Llewellyn | Oct. 24, 1944 |
| 2,415,240 | Fouhy | Feb. 4, 1947 |
| 2,745,520 | Boutard | May 15, 1956 |

FOREIGN PATENTS

| | | |
|---|---|---|
| 922,320 | France | Jan. 27, 1947 |
| 1,114,635 | France | Dec. 19, 1955 |